(12) United States Patent
Kawaguchi et al.

(10) Patent No.: US 8,466,900 B2
(45) Date of Patent: Jun. 18, 2013

(54) CAPACITANCE SENSOR AND INFORMATION INPUT APPARATUS

(75) Inventors: Hiroto Kawaguchi, Miyagi (JP); Ryota Kitamura, Miyagi (JP); Takashi Itaya, Miyagi (JP)

(73) Assignee: Sony Corporation, Tokyo (JP)

( * ) Notice: Subject to any disclaimer, the term of this patent is extended or adjusted under 35 U.S.C. 154(b) by 184 days.

(21) Appl. No.: 13/166,279

(22) Filed: Jun. 22, 2011

(65) Prior Publication Data

US 2012/0001867 A1 Jan. 5, 2012

(30) Foreign Application Priority Data

Jun. 30, 2010 (JP) ................................. 2010-148816

(51) Int. Cl.
*G06F 3/045* (2006.01)
(52) U.S. Cl.
USPC .......................................... 345/174; 345/173
(58) Field of Classification Search
USPC ............... 345/156, 173, 174, 179; 178/18.06, 178/19.03; 324/649, 658, 660
See application file for complete search history.

(56) References Cited

U.S. PATENT DOCUMENTS

| 7,808,255 | B2 * | 10/2010 | Hristov et al. | 324/686 |
| 8,125,462 | B2 * | 2/2012 | Lin et al. | 345/173 |
| 2007/0114993 | A1 * | 5/2007 | Goldfine et al. | 324/239 |
| 2007/0279395 | A1 * | 12/2007 | Philipp et al. | 345/173 |
| 2009/0273571 | A1 * | 11/2009 | Bowens | 345/173 |
| 2009/0273572 | A1 * | 11/2009 | Edwards et al. | 345/173 |
| 2010/0295813 | A1 * | 11/2010 | Kent | 345/174 |
| 2011/0279406 | A1 * | 11/2011 | Kawaguchi et al. | 345/174 |
| 2011/0291939 | A1 * | 12/2011 | Tsukahara et al. | 345/168 |

FOREIGN PATENT DOCUMENTS

| JP | 59-119630 | 7/1948 |
| JP | 59-121484 | 7/1984 |

* cited by examiner

*Primary Examiner* — Joe H Cheng
(74) *Attorney, Agent, or Firm* — K&L Gates LLP

(57) ABSTRACT

Provided is a capacitance sensor including: a first electrode including a first region gradually larger in height with respect to a width direction parallel to a first direction in parallel with a second direction orthogonal to the first direction, a second region gradually smaller in height with respect to the width direction, and a third region causing the first and second regions to be opposed; a second electrode opposed to the first region in the second direction, and gradually smaller in height with respect to the first direction in parallel with the second direction; a third electrode opposed to the second region in the second direction and gradually larger in height with respect to the first direction in parallel with the second direction; and a support body supporting electrode groups including the first to third electrodes while connected via the third region, and arranging those groups along the second direction.

11 Claims, 6 Drawing Sheets

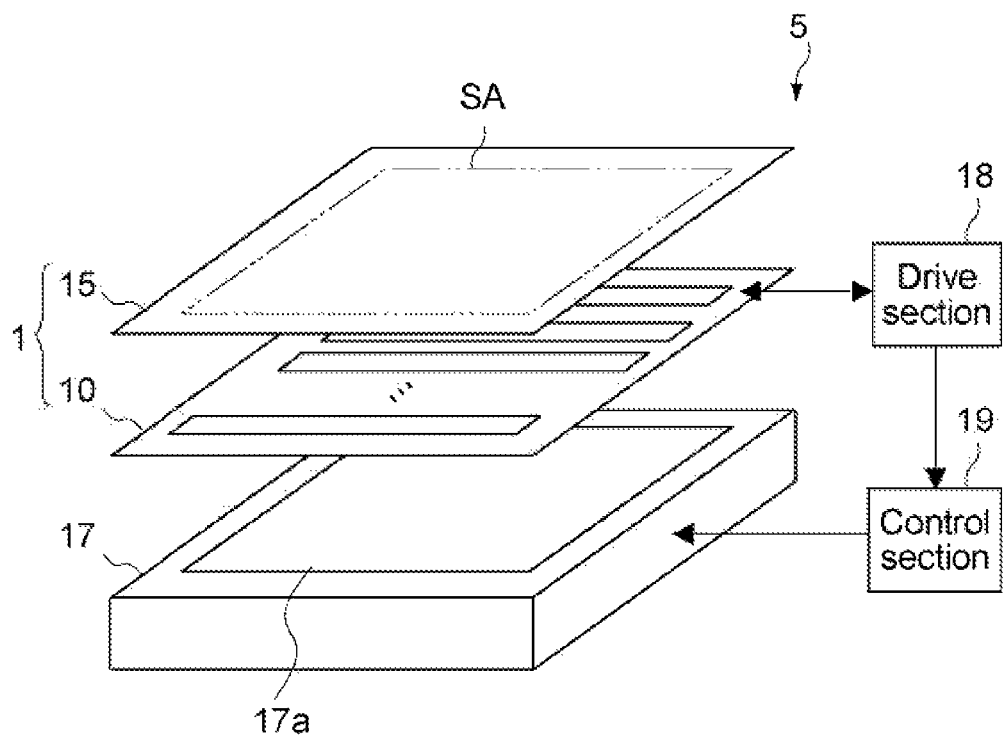
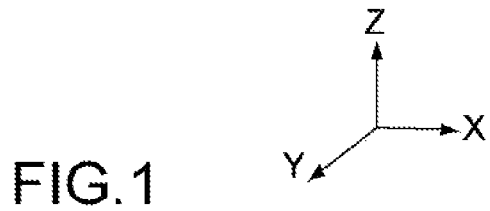
FIG.1

CAPACITANCE SENSOR AND INFORMATION INPUT APPARATUS

CROSS REFERENCES TO RELATED APPLICATIONS

The present application claims priority to Japanese Priority Patent Application JP 2010-148816 filed in the Japan Patent Office on 30 Jun. 2010, the entire content of which is hereby incorporated by reference.

BACKGROUND

The present application relates to a capacitance sensor and an information input apparatus which are capable of detecting a contact or proximate position of a finger in accordance with changes in capacitance.

In recent years, there has been widespread usage of electronic apparatuses that detect a position of a finger in accordance with changes in capacitance and control screen display and apparatus operation. This kind of capacitance sensors generally determine a contact or proximate position of a finger in a flat plane by detecting changes in capacitance of a plurality of electrodes arranged in the flat plane. For example, Japanese Patent Application Laid-open No. 59-119630 (p. 3, FIG. 5) (hereinafter, referred to as Patent Document 1) discloses a touch switch apparatus having an electrode structure with two triangular touch electrodes formed by dividing a rectangle into two parts along a diagonal line, the touch electrodes being arranged in a uniaxial direction so that oblique sides thereof are opposed to each other with a slight clearance therebetween. According to such an electrode structure, since an area of a finger overlapping each of the touch electrodes varies depending on a uniaxial position of the finger, it is possible to identify a contact position of the finger in accordance with rates of changes in capacitance of the touch electrodes. In addition, Japanese Patent Application Laid-open No. 59-121484 (p. 3, FIG. 5) (hereinafter, referred to as Patent Document 2) discloses a coordinate input apparatus including a plurality of rectangular touch electrodes arranged in a biaxial direction at predetermined intervals in a matrix of 4×4, to identify a biaxial contact position of a finger in accordance with rates of changes in capacitance of the touch electrodes.

SUMMARY

However, in the electrode structure disclosed in Patent Document 1, if the touch electrodes are wider along the uniaxial direction, the oblique sides of the touch electrodes each form a gentle angle, which decreases detection resolution for a contact position of a finger. In the electrode structure disclosed in Patent Document 2, signal lines are connected to the touch electrodes and routed through the clearance between the electrodes. The signal lines are capacitively coupled to a finger as the touch electrodes are, and therefore the signal lines need to be made thin to suppress decrease of detection accuracy due to the capacitive coupling of the signal lines. However, making the signal lines thin increases electric resistance in the signal lines, which deteriorates the touch electrodes in sensitivity of capacitance change.

In light of such circumstances, it is desirable to provide a capacitance sensor and an information input apparatus which are capable of enhancing accuracy of biaxial position detection and preventing decrease of sensitivity resulting from the presence of wiring lines within a detection area.

According to an embodiment, there is provided a capacitance sensor including a first electrode, a second electrode, a third electrode, and a support body.

The first electrode includes a first region that is gradually larger in height, with respect to a width direction parallel to a first direction, in parallel with a second direction orthogonal to the first direction, a second region that is gradually smaller in height with respect to the width direction, and a third region that causes the first region and the second region to be opposed to each other.

The second electrode is opposed to the first region in the second direction, and gradually smaller in height with respect to the first direction, in parallel with the second direction.

The third electrode is opposed to the second region in the second direction, and gradually larger in height with respect to the first direction, in parallel with the second direction.

The support body supports a plurality of electrode groups including the first, second, and third electrodes in such a state that the plurality of electrode groups are connected to each other via the third region, and arranges the plurality of electrode groups along the second direction.

The electrode groups including the first to third electrodes change gradually in area ratio of the first electrode (first region) and the second electrode and in area ratio of the first electrode (second region) and the third electrode with respect to the first direction. Accordingly, it is possible to identify a position of a detection target on the electrode groups by detecting rates of changes in capacitance (amounts of changes in capacitance) of the electrodes.

In the above-mentioned capacitance sensor, since each of the electrode groups is divided into three parts in the first direction, it is possible to increase the rates of changes in capacitance of the electrodes in accordance with changes in position of the detection target in the first direction. This enhances accuracy of position detection of the detection target in the first direction.

In addition, since the electrode groups are arranged on the support body in the second direction, it is possible to detect changes in position of the detection target in the second direction with high accuracy in accordance with the rates of changes in capacitance of the electrode groups.

Further, when all the second electrode and the third electrode constituting the electrode groups are directed toward an outside of a detection area in the first direction, it is possible to eliminate the need for wiring lines connected to these electrodes to be routed within the detection area. This prevents decrease in detection sensitivity resulting from the presence of wiring lines within the detection area.

The first region may have a first oblique side opposed to the second electrode.

The second region may have a second oblique side opposed to the third electrode.

This makes it possible to form a straight boundary between the first region and the second electrode and a straight boundary between the second region and the third electrode. Accordingly, it is possible to provide a predetermined proportional relation between the position of the detection target with respect to the first direction and the capacity ratio between the electrodes, to thereby result in stable detection sensitivity. Each of the first region and the second region may have a maximum value of the height at a connection part with the third region.

As a result, it is possible to form the first electrode in a symmetrical shape with respect to a central part and to prevent occurrence of variations in detection sensitivity between the first region side and the second region side.

The first electrode may be made wide to cover a detection area of a detection target along the first direction.

Each of the second and third electrodes may have a first end opposed to the third region and a second end directed toward an outside of the detection area with respect to the first direction.

This allows wiring lines to be connected to these electrodes without routing within the detection area. Accordingly, it is possible to prevent decrease in detection sensitivity resulting from the presence of wiring lines within the detection area.

The third region may cause the first region and the second region to be opposed to each other in such a state that the first region and the second region are connected to each other.

As a result, the first electrodes of the electrode groups are connected to each other so that an integral first electrode is configured. When a count value of this first electrode is detected, it is possible to determine whether a detection target is in proximity to or in contact with a detection area.

The support body may support the plurality of electrode groups in such a state that the plurality of electrode groups are connected to each other via the third region as a plurality of electrode group units, and may arrange the plurality of electrode group units along the second direction.

With this configuration, when count values of the first electrodes of the plurality of electrode group units are detected, it is possible to determine which electrode group unit side of the detection area the detection target is in proximity to or in contact with.

The third region may include a first connection part that connects one first region to another first region of the plurality of electrode groups, and a second connection part that is opposed to the first connection part in such a state that the second connection part is away from the first connection part, and that connects one second region to another second region of the plurality of electrode groups.

As a result, when count values of the first regions of the electrode groups connected to each other and count values of the second regions of the electrode groups connected to each other are detected, it is possible to determine which of the first region side and the second region side of the detection area the detection target is in proximity to or in contact with.

The support body may support the plurality of electrode groups in such a state that the plurality of electrode groups are connected to each other via the third region as a plurality of electrode group units, and may arrange the plurality of electrode group units along the second direction.

With this configuration, when count values of the first regions of the electrode groups connected to each other of the plurality of electrode group units and count values of the second regions of the electrode groups connected to each other are detected, it is possible to determine which electrode group unit side of the detection area, and in addition, which of a right half region and a left half region thereof the detection target is in proximity to or in contact with.

According to an embodiment, there is provided an information input apparatus including a first electrode, a second electrode, a third electrode, a support body, a signal generation section, and a control section.

The first electrode includes a first region that is gradually larger in height, with respect to a width direction parallel to a first direction, in parallel with a second direction orthogonal to the first direction, a second region that is gradually smaller in height with respect to the width direction, and a third region that connects the first region with the second region.

The second electrode is opposed to the first region in the second direction, and gradually smaller in height with respect to the first direction, in parallel with the second direction.

The third electrode is opposed to the second region in the second direction, and gradually larger in height with respect to the first direction, in parallel with the second direction.

The support body supports a plurality of electrode groups each including the first, second, and third electrodes in such a state that the plurality of electrode groups are connected to each other via the third region, and arranges the plurality of electrode groups along the second direction.

The signal generation section generates signal voltages to oscillate the first to third electrodes.

The control section generates a control signal containing information about position of a detection target with respect to the first and second directions, on a basis of a change in capacitance of the plurality of electrode groups.

As a result, when a count value of the first electrode is detected, it is possible to determine whether the detection target is in proximity to or in contact with the detection area. Only the first electrode is oscillated until the proximity of the detection target is detected on the basis of the change in capacitance, and the first electrode, the second electrode, and the third electrode are scanned when the proximity of the detection target is detected. This makes it possible to save the electrodes to be driven, as compared with the case where the first electrode, the second electrode, and the third electrode are scanned also before the proximity of the detection target is detected.

The information input apparatus may further include a display element that is opposed to the support body and includes a display surface for an image.

The control signal may include a signal for controlling an image to be displayed on the display surface.

The plurality of electrode groups and the support body may be each formed of a translucent material.

According to an embodiment, it is possible to enhance accuracy of biaxial position detection and prevent decrease in sensitivity resulting from the presence of wiring lines within the detection area.

Additional features and advantages are described herein, and will be apparent from the following Detailed Description and the figures.

BRIEF DESCRIPTION OF THE FIGURES

FIG. 1 is an exploded schematic perspective view of a configuration of an information input apparatus including a capacitance sensor according to a first embodiment;

DETAILED DESCRIPTION

Figure 2:
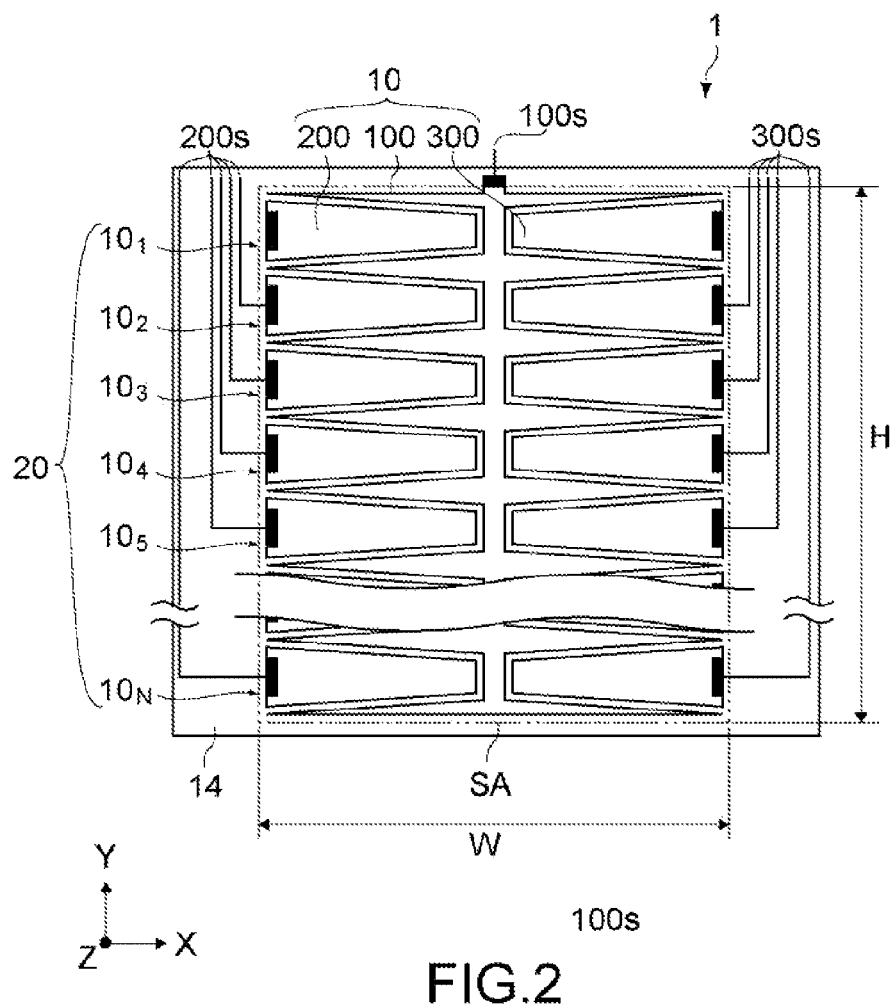
FIG. 2 is a schematic plane view of the capacitance sensor.

Embodiments of the present application will be described below in detail with reference to the drawings.

First Embodiment

Information Input Apparatus

FIG. 1 is an exploded schematic perspective view of a configuration of an information input apparatus including a capacitance sensor according to an embodiment.

An information input apparatus 5 of this embodiment includes a capacitance sensor 1, a display element 17, a drive section 18, and a control section 19. The information input apparatus 5 constitutes an electronic apparatus such as a portable information terminal or a stationary information display apparatus. It should be noted that in the figure, a case for housing the capacitance sensor 1, the display element 17, and the like, is not shown.

Capacitance Sensor

FIG. 2 is a schematic plane view of a configuration of the capacitance sensor 1.

The capacitance sensor 1 includes a detection area SA with a width W and a height H. The capacitance sensor 1 is placed on an operation screen 17a of the display element 17, and is configured as a sensor panel for detecting proximity or contact of a detection target (e.g. a user's finger) within the detection area SA in accordance with changes in capacitance. It should be noted that in FIGS. 1 and 2, an X axis denotes an axis parallel to a transverse side of the operation screen 17a, a Y axis denotes an axis parallel to a longitudinal side of the operation screen 17a, and a Z axis denotes an axis vertical to the operation screen 17a.

The capacitance sensor 1 has a plurality of electrode groups $10_1, 10_2, 10_3, 10_4, \ldots, 10_N$ and a support body 14 for supporting these electrode groups as shown in FIG. 2. The electrode groups are arranged along the Y axis direction (second direction) with a constant pitch on a surface of the support body 14. In FIG. 2, the electrode groups are given reference numerals $10_1, 10_2, 10_3, 10_4, \ldots, 10_N$ in sequence along a +Y direction. The electrode groups are identical in configuration, and therefore are collectively called "electrode group 10" herein, except for the cases where the electrode groups are individually described.

As shown in FIG. 2, the electrode group 10 includes a first electrode 100, a second electrode 200, and a third electrode 300.

Figure 3:
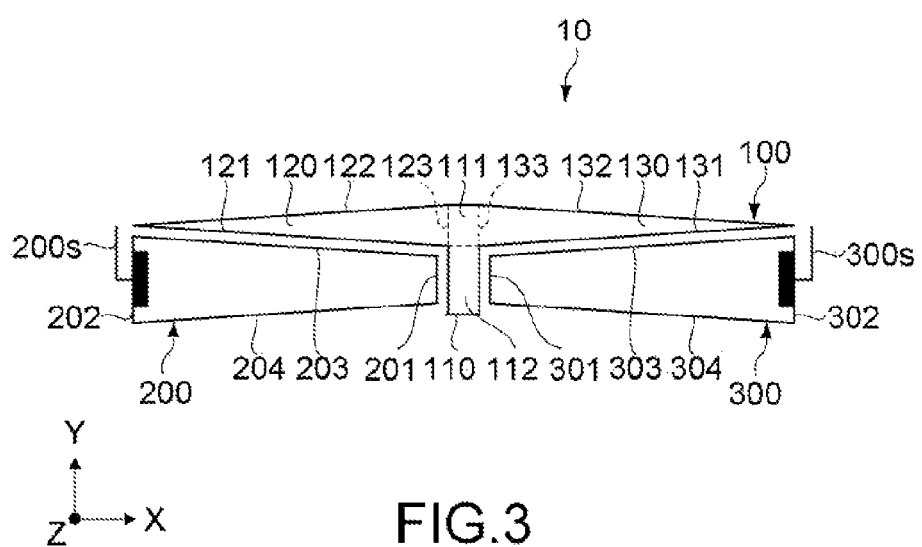
FIG. 3 is an enlarged plane view of one electrode group.

FIG. 3 is an enlarged plane view of one electrode group.

The first electrode 100 has a bottom side parallel to the X axis direction (first direction). A length of the bottom side is made almost identical to the width W of the detection area SA. That is, the first electrode 100 is wide so as to cover the width of the detection area SA along the X axis direction. The first electrode 100 includes a first region 120, a second region 130, and a third region 110.

The first region 120 is gradually larger in height parallel to the +Y direction (height direction) with respect to a width direction parallel to a +X direction. Specifically, the first region 120 is formed of an approximate isosceles triangle having two oblique sides 121 and 122 forming a bottom side 123 as a maximum value of height of the first region 120 at a connection part (to be described later) with the third region 110.

The second region 130 is gradually smaller in height parallel to the +Y direction (height direction) with respect to the width direction parallel to the +X direction. Specifically, the second region 130 is formed of an approximate isosceles triangle having two oblique sides 131 and 132 forming a bottom side 133 as a maximum value of height of the second region 130 at a connection part (to be described later) with the third region 110. It should be noted that although, for the sake of understanding, FIG. 3 shows broken lines denoting the bottom sides 123 and 133, such lines does not exist in the actual first electrode 100 as shown in FIG. 2 and the like.

The third region 110 connects the first region 120 with the second region 130. Specifically, the third region 110 includes a region connection part 111 and an electrode group connection part 112. The region connection part 111 causes the first region 120 and the second region 130 to be opposed to each other in such a state that the first region 120 and the second region 130, which are opposed to each other, is connected to each other. The electrode group connection part 112 is continuous with the region connection part 111 in the Y direction, and has a width equal to that of the region connection part 111. The electrode group connection part 112 connects the region connection parts 111 and 111 of the adjacent electrode groups 10 and 10 to each other in the Y axis direction.

The second electrode 200 is opposed to the first region 120 in the Y axis direction, and is formed so as to be gradually smaller in height parallel to the +Y direction (height direction) with respect to the +X direction (width direction). Specifically, the second electrode 200 is opposed to the electrode group connection part 112 of the third region 110 in the X axis direction, and is opposed to the first regions 120 and 120 of the two adjacent electrode groups 10 and 10 in the Y axis direction. More specifically, the second electrode 200 is formed of an isosceles trapezoid that has an upper side 201 parallel to the Y axis opposed to the electrode group connection part 112 of the third region 110, a lower side 202 opposite to the upper side 201, a straight oblique side 203 opposed to the oblique side 121 of the first region 120, and an oblique side 204 opposed to the oblique side 122 of the first region 120 of the adjacent electrode group 10.

The oblique side 121 of the first region 120 and the oblique side 203 of the second electrode 200 form an identical angle of inclination with respect to the X axis. The two oblique sides 121 and 203 have a constant clearance therebetween. The oblique side 122 of the first region 120 and the oblique side 204 of the second electrode 200 form an identical angle of inclination with respect to the X axis. The two oblique sides 122 and 204 have a constant clearance therebetween. The electrode group connection part 112 of the third region 110 and the upper side 201 of the second electrode 200 are parallel to the Y axis. The electrode group connection part 112 and the upper side 201 have a constant clearance therebetween. There is no particular limitation on size of the clearance, as far as the clearance provides electric isolation between the first electrode 100 and the second electrode 200.

The third electrode 300 is opposed to the second region 130 in the Y axis direction, and is formed so as to be gradually larger in height parallel to the +Y direction (height direction) with respect to the +X direction (width direction). Specifically, the third electrode 300 is opposed to the electrode group connection part 112 of the third region 110 in the X axis direction, and is opposed to the second regions 130 and 130 of the two adjacent electrode groups 10 and 10 in the Y axis direction. More specifically, the third electrode 300 is formed of an isosceles trapezoid that has an upper side 301 parallel to the Y axis opposed to the electrode group connection part 112 of the third region 110, a lower side 302 opposite to the upper side 301, a straight oblique side 303 opposed to the oblique side 131 of the second region 130, and an oblique side 304 opposed to the oblique side 131 of the second region 130 of the adjacent electrode group 10.

The oblique side 131 of the second region 130 and the oblique side 303 of the third electrode 300 form an identical angle of inclination with respect to the X axis. The two oblique sides 131 and 303 have a constant clearance therebetween. The oblique side 132 of the second region 130 and the oblique side 304 of the third electrode 300 form an identical angle of inclination with respect to the X axis. The two oblique sides 132 and 304 have a constant clearance therebetween. The electrode group connection part 112 of the third region 110 and the upper side 301 of the third electrode 300 are parallel to the Y axis. The electrode group connection part 112 and the upper side 301 have a constant clearance therebetween. There is no particular limitation on size of the clearance, as far as the clearance provides electric isolation between the first electrode 100 and the third electrode 300.

The second electrode 200 and the third electrode 300 are opposed to each other in the X axis direction while sandwiching the third region 110 of the first electrode 100 therebetween, and are symmetrical with respect to a straight line parallel to the Y axis direction passing through the central part of the first electrode 100.

It should be noted that although as shown in FIG. 2, the first electrodes 100 and 100 located at the both ends in the Y axis direction are different in shape from the other first electrodes 100, their function and the like are the same as those of the other first electrodes 100.

According to this embodiment, the first region 120 and the second electrode 200 of the first electrode 100 have straight oblique sides as a boundary part therebetween, and the second region 130 and the third electrode 300 of the first electrode 100 have straight oblique sides as a boundary part therebetween, respectively. This provides stable detection sensitivity with predetermined proportional relations between the position of the detection target with respect to the X axis direction and the ratio of capacitance between the electrodes.

In addition, since the first electrode is generally formed in a symmetrical shape with respect to the central part of the third region 110 as an axis of symmetry, it is possible to prevent occurrence of variations in detection sensitivity between a side of the first region 120 and the second electrode 200 and a side of the second region 130 and the third electrode.

The support body 14 is opposed to an image display surface (operation screen 17a) of the display element 17. The support body 14 supports the plurality of electrode groups 10 thus configured in such a state that the electrode groups 10 are connected to each other via the third region 110, so as to keep the electrode groups 10 arranged with a predetermined pitch in the Y axis direction. It should be noted that in the following description, the plurality of electrode groups 10, that are connected to each other via the third region 110, which are supported by the support body 14, are also referred to as "electrode group unit 20." The support body 14 is formed of a flexible, electrical isolating plastic film of polyethylene terephthalate (PET), polyethylene naphthalate (PEN), polyimide (PI), polycarbonate (PC), or the like. It should be noted that alternatively, the support body 14 may use a rigid material such as glass and ceramics.

The electrode group 10 (first to third electrodes 100 to 300) and the support body 14 are each formed of translucent materials. For example, the electrode group 10 is formed of a transparent conductive oxide such as indium tin oxide (ITO), SnO, and ZnO. The support body 14 is formed of a transparent resin film of PET, PEN, or the like. Accordingly, it is possible to see an image displayed on the operation screen 17a from the outside through the capacitance sensor 1.

There is no particular limitation on a formation method for the electrode groups 10. For example, a conductive film constituting the electrode group 10 may be formed on the support body 14, using a thin-film formation method such as vapor deposition, sputtering, and CVD. In this case, after formation of the conductive film on a substrate, the conductive film may be patterned in a predetermined shape. Alternatively, after formation of the conductive film on a surface of the substrate with a resist mask, an excessive conductive film may be removed (lifted off) together with the resist mask from the substrate. Besides, an electrode pattern may be formed on the substrate using a printing method such as plating or screen printing.

The electrode group 10 further includes signal lines (wiring lines) for connecting the first to third electrodes 100 to 300 to the drive section 18. In this embodiment, a signal line 100s is connected to one end of the first electrode 100 in the Y axis direction, and signal lines 200s and 300s are connected to the bottom sides 202 and 302 of the second electrode 200 and the third electrode 300 directed toward the outside of the detection area SA, respectively.

The signal lines 100s to 300s are routed in an area outside of the detection area SA on the support body 14, and are connected to the drive section 18 via external connection terminals such as connectors not shown.

The signal lines 100s to 300s may be formed of a constitutional material for the first electrode 100, the second electrode 200, and the third electrode 300. In this case, the signal lines 100s to 300s can be formed simultaneously with formation of the first electrode 100, the second electrode 200, and the third electrode 300. Meanwhile, the signal lines 100s to 300s may be formed of a non-translucent conductive material, for example, metal lines of aluminum (Al), silver (Ag), copper (Cu), or the like. In this case, a wiring line layer can be made of a low-resistivity material, which allows detection of changes in capacitance of the first electrode 100, the second electrode 200, and the third electrode 300 with high sensitivity. Further, since the signal lines 100s to 300s are positioned outside of the detection area SA, it is possible to prevent that the signal lines 100s to 300s impair image visibility as far as the outside of the detection area SA is out of an effective pixel area of the operation screen 17a.

The width of the electrode group 10 is set to the width W of the detection area SA. The width (dimension in the X axis direction) of the electrode group 10 may be identical to, larger than, or smaller than the width W of the detection area SA. What matters is, the electrode group 10 is formed so as to have such a size that the electrode group 10 covers the full width of the detection area SA.

Meanwhile, the height h (dimension in the Y axis direction) of the electrode group 10 is set as appropriate according to a height H of the detection area SA, a size of a detection target, a detection resolution in the Y axis direction, or the like. In this embodiment, a user's finger is assumed as the detection target, and each of the bottom side 123 of the first region 120 of the first electrode 100, the bottom side 133 of the second region 130 of the first electrode 100, the lower side 202 of the second electrode 200, and the lower side 302 of the third electrode 300 is set to 5 mm to 10 mm, for example, in consideration of a size of a part of the finger in contact with the operation surface. Similarly, there is no particular limitation on the number of columns of the electrode groups 10 along the Y axis direction. The number of columns is set as appropriate according to the height of the detection area SA, the size of the detection target, the detection resolution in the Y axis direction, or the like.

In addition, the total sum of the height of the first electrode 100 and the height of the second electrode 200 and the third electrode 300 is made constant with respect to the +X direction. This allows the height of the entire electrode group to be constant, to thereby make it possible to suppress occurrence of variations in detection sensitivity depending on the position of the detection target with respect to the X axis direction.

Further, as shown in FIG. 1, the capacitance sensor 1 includes a protection layer 15 for covering all the columns of the electrode groups 10. The protection layer 15 is formed of a translucent resin film of PET, PEN or the like, a plastic plate, a glass sheet, or the like. In addition, an outermost surface of the protection layer 15 constitutes an operation surface to be touched and operated by a user.

According to this embodiment, when both of the second electrode 200 and the third electrode 300 are directed toward the outside of the detection area SA with respect to the X axis direction, it is possible to eliminate the need for the signal lines 200s and 300s respectively connected to the second electrode 200 and the third electrode 300 to be routed within the detection area SA. This prevents decrease in detection sensitivity resulting from the presence of wiring lines within the detection area SA.

Drive Section

The drive section 18 driving the electrode group 10 includes a signal generation circuit for generating signal voltages to be supplied to the electrodes 100 to 300, and an arithmetic circuit for calculating capacitance of the electrodes 100 to 300 and changes in capacitance. There is no particular limitation on signal voltages as far as the signals are capable of oscillating the electrodes 100 to 300. For example, the signals may be pulse signals with a predetermined frequency, high frequency signals, alternating current signals, or direct current signals. There is no particular limitation on arithmetic circuit as far as the arithmetic circuit is capable of detecting capacitance of the oscillating electrodes or amounts of changes in capacitance. The arithmetic circuit of this embodiment converts amounts of changes in capacitance into integer values (count values), and outputs the same to the control section 19.

In this embodiment, a so-called self-capacitance method is employed to detect capacitance and capacitance changes of the electrodes 100 to 300. The self-capacitance method is also called single-electrode method using only one electrode for sensing. The electrode for sensing has a floating capacitance with respect to a ground potential. When a grounded detection target such as a human body (a finger) comes close, the electrode increases in floating capacitance. The arithmetic circuit calculates proximity and position coordinates of a finger by detecting this capacitance increase.

There is no particular limitation on order of oscillation of the electrodes 100 to 300, that is, scanning method for the electrodes 100 to 300. The electrodes 100 to 300 may be oscillated in sequence in the width direction (+X direction) or in the opposite direction (−X direction). In addition, all the columns of the electrodes may be oscillated instantaneously or sequentially (in the Y direction, for example).

Further, all the electrodes 100 to 300 may not be oscillated at any time but may be oscillated with omission of predetermined electrodes. For example, only the first electrodes 100 of all the columns (or some of the columns with predetermined omissions) may be oscillated until proximity of the detection target (such as a user's finger) is detected, and then the number of electrodes to be oscillated may be increased with increasing proximity of the detection target. In addition, electrodes to be oscillated may be selected in a display mode of the operation screen 17a. For example, if images requiring input operations by a finger are densely located on the left side of the screen, only the second electrodes 200 may be scanned, and in contrast, if those images are densely located on the right side of the screen, only the third electrodes 300 may be scanned. This makes it possible to save the electrodes to be driven, as compared with the case where all the electrodes are scanned.

Control Section

The control section 19 generates control signals for controlling an image displayed on the operation screen 17a of the display element 17 in accordance with output from the drive section 18, and outputs the same to the display element 17. The control section 19 typically includes a computer which identifies an operating position, an operating direction, and the like of a finger in the detection area SA, and performs predetermined image control operations in accordance with these detection results. For example, the control section 19 performs screen control operations according to the user's intention, such as changing images on the screen correspondingly to the operating position and moving an image along the operating direction.

The control section 19 may generate other control signals for controlling other functions of the information input apparatus 5. For example, the control section 19 may allow various functions to be performed, such as telephone calling, line switching, dictionary searching, text information input, and game playing, depending on the operating position on the operation screen 17a.

The control section 19 may not necessarily be formed of a circuit separated from the drive section 18, but may include a circuit integrated with the drive section 18. For example, the control section 19 and the drive section 18 may be configured by a single semiconductor chip (IC chip).

Example of Operation of Information Input Apparatus

Next, an example of operation of the capacitance sensor 1 will be described. Herein, a method of detecting an input operating position (XY coordinates) of a finger with the use of the capacitance sensor 1 will be explained. It should be noted that, as described above, the control section 19 determines the input operating position.

Detection in Y Axis Direction

Next, a method of detecting an input operating position (XY coordinates) of a finger with the use of the capacitance sensor 1 will be explained. It should be noted that, as described above, the control section 19 determines the input operating position.

First, a method of detecting an operating position with respect to the Y axis direction on the operation screen 17a will be described. For detection of an operating position with respect to the Y axis direction, reference is made to changes in capacitance of the second electrodes 200 or changes in capacitance of the third electrodes 300. Specifically, in detection of the operating position with respect to the Y axis direction, changes in capacitance of the plurality of second electrodes 200 and changes in capacitance of the plurality of third electrodes 300 are detected, and the contact position of the finger with respect to the Y direction is determined on the basis of the levels thereof.

In detection of capacitance by the self-capacitance method, capacitance (floating capacitance) becomes larger with increasing proximity of the finger. Therefore, it is possible to specify that the finger is in proximity to or in contact with a position immediately above one electrode having a maximum amount of change in capacitance detected among the plurality of second electrodes 200 and the plurality of third electrodes 300. Otherwise, in the case where almost equal maximum amounts of changes in capacitance are detected from the two adjacent second electrodes 200 and 200 or the two adjacent third electrodes 300 and 300, it is possible to specify that the finger is in proximity to or in contact with a position immediately above the two adjacent electrodes. Otherwise, in the case where the maximum amount of change in capacitance and the second largest amount of change in capacitance are detected from the two adjacent second electrodes 200 and 200 or the two adjacent third electrodes 300 and 300, it is possible to specify that the finger is in proximity to or in contact with a position shifted to the one electrode from a position immediately above the two adjacent electrodes.

In addition, by setting an appropriate threshold for count value, it is possible to determine a proximity distance of the finger with respect to the capacitance sensor 1. Specifically, when a first threshold (touch threshold) is set for count value and a count value exceeds the threshold, it is determined whether a touch operation is performed by a finger on the operation screen 17a. In addition, a second threshold smaller than the first threshold may be set. This makes it possible to determine proximity of the finger before a touch operation, which allows detection of the finger's input operation in a non-contact manner.

According to this embodiment, the second electrode 200 and the third electrode 300 are arranged along the Y axis direction. Accordingly, it is possible to detect changes in position of the detection target in the Y axis direction with high accuracy in accordance with the rates of changes in capacitance of the second electrode 200 and the third electrode 300.

Detection in X Axis Direction

Next, a method of detecting an operating position on the operation screen 17a with respect to the X axis direction will be described. For detection of an operating position with respect to the X axis direction, reference is made to a change in capacitance of the first electrode 100 and changes in capacitance of the second electrodes 200 or changes in capacitance of the third electrodes 300. Specifically, in detection of the X axis direction, a change in capacitance of the first electrode 100, changes in capacitance of the plurality of second electrodes 200, and changes in capacitance of the plurality of third electrodes 300 are detected, and the contact position of the finger is determined with respect to the X direction from the levels thereof.

Figure 4:
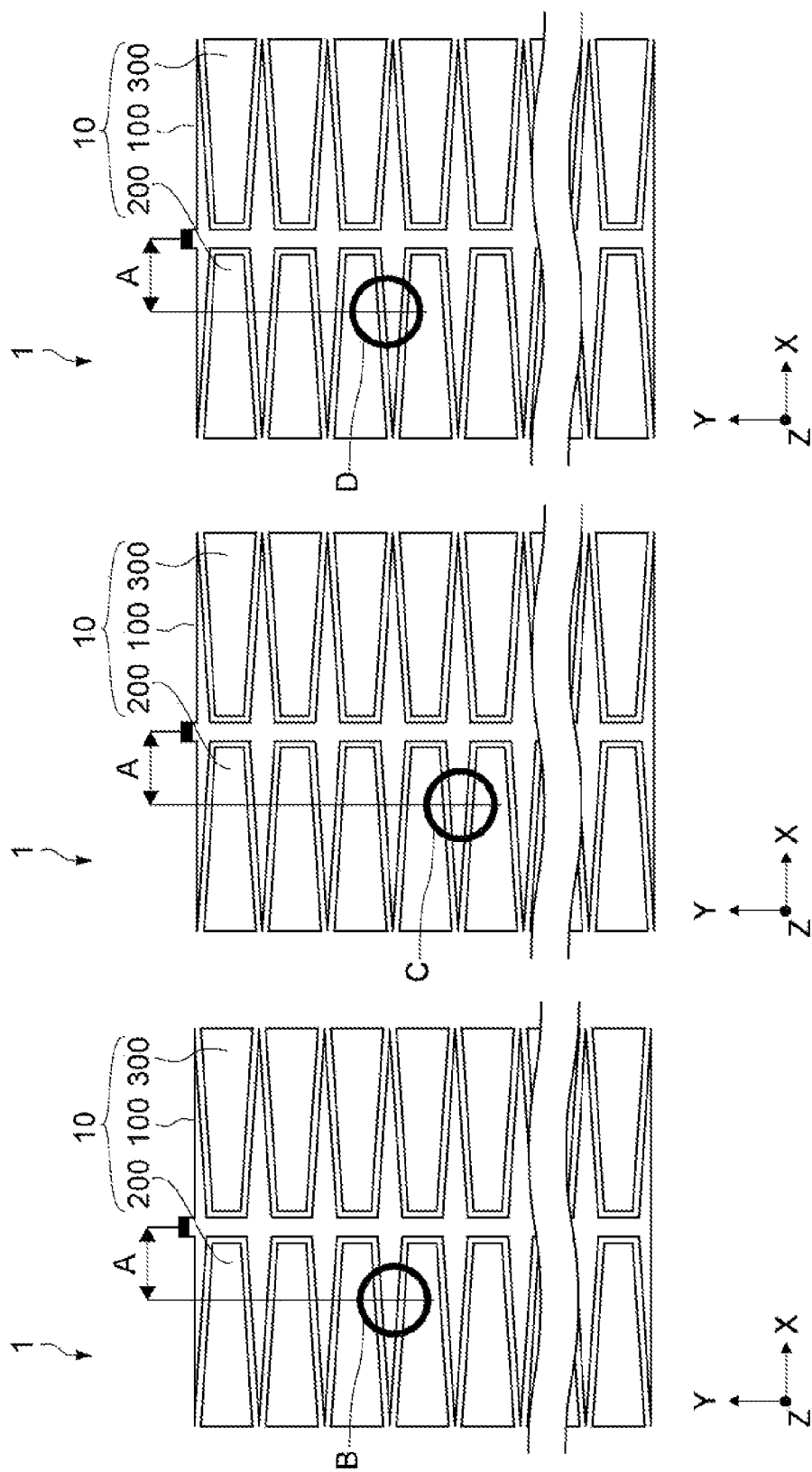
FIGS. 4A-4C are views for describing a method of detecting an operating position with respect to an X axis direction.

FIGS. 4A to 4C are views for describing the method of detecting the operating position with respect to the X axis direction.

As shown in the drawings, in the case where one finger is in contact with a plurality of positions B, C, and D equal (located at the same distance A) in the X axis direction but different in the Y axis direction on the operation screen 17a, amounts of changes in capacitance (count change amounts) of the first electrode 100 are equal in principle. Here, assumed that the count change amount of the first electrode 100 is $\Delta C1$, the count change amounts of the plurality of second electrodes 200 are $\Delta C2$, and the count change amounts of the plurality of third electrodes 300 are $\Delta C3$, an operating position with respect to the X axis direction on the operation screen 17a can be determined according to the expression of $\Delta C2/(\Delta C1+\Delta C2)\times$constant in the case where the operating position is located on the second electrodes 200 side. Otherwise, in the case where the operating position is located on the third electrodes 300 side, the operating position can be determined according to the expression of $\Delta C3/(\Delta C1+\Delta C3)\times$constant.

According to this embodiment, the electrode group 10 changes gradually, with respect to the X axis direction, in area ratio of the first region 120 and the second electrodes 200 of the first electrode 100 and in area ratio of the second region 130 of the first electrode 100 and the third electrodes 300. Accordingly, it is possible to identify the position of the detection target on the electrode group 10 by detecting rates of changes in capacitance (or amounts of changes in capacitance) of the electrodes 100 to 300.

In addition, since each of the electrode groups 10 is divided into three in the X axis direction, it is possible to increase the rates of changes in capacitance of the electrodes 100 to 300 in accordance with changes in position of the detection target along the X axis direction. This enhances accuracy of position detection of the detection target along the X axis direction.

Example of Operation of Information Input Apparatus

Next, an example of operation of the capacitance sensor 1 will be described.

First, the signal generation circuit of the drive section 18 is controlled by the control section 19 to generate a signal voltage and supply the same to the first electrode 100 and oscillate the first electrode 100. When the arithmetic circuit of the drive section 18 detects a change in capacitance of the first electrode 100, and the arithmetic circuit converts an amount of the change in capacitance of the first electrode 100 into integer value (count value), and outputs the same to the control section 19. When receives the output from the arithmetic circuit, the control section 19 specifies that the detection target is in proximity to or in contact with the operation screen 17a, supplies the signal voltages also to the second electrode 200 and the third electrode 300 in addition to the first electrode 100, and oscillates the first electrode 100, the second electrode 200, and the third electrode 300.

When the arithmetic circuit of the drive section 18 detects changes in capacitance of the first electrode 100, the second electrode 200, and the third electrode 300, the arithmetic circuit of the drive section 18 converts the amounts of changes in capacitance of the first electrode 100, the second electrode 200, and the third electrode 300 into integer values (count values), and outputs the same to the control section 19. When receives the output from the arithmetic circuit, the control section 19 determines a proximate or contact position (XY coordinate) of the detection target on the operation screen 17a.

According to this example of operation, only the first electrode 100 is oscillated until the proximity of the detection target is detected on the basis of the change in capacitance, and the first electrode 100, the second electrode 200, and the third electrode 300 are scanned when the proximity of the detection target is detected.

This makes it possible to save the electrodes to be driven, as compared with the case where the first electrode 100, the second electrode 200, and the third electrode 300 are scanned also before the proximity of the detection target is detected.

Second Embodiment

In the first embodiment, the capacitance sensor 1, which the first electrode 100 is integrated with, and which is connected to one signal line 100s, has been described. In the following embodiment, a capacitance sensor including a first electrode having a configuration different from that of the first embodiment will be described.

Hereinafter, the description of the same configuration, the same function, and the like as those of the first embodiment will be omitted or simplified, and the different points will be mainly described. In this embodiment, sections of the capacitance sensor having the same configuration as the sections of the capacitance sensor 1 of the first embodiment are denoted by the corresponding reference symbols (400 series in regard to first electrode, electrode group 40, electrode group unit 50), and the duplicated description will be omitted.

Figure 5:
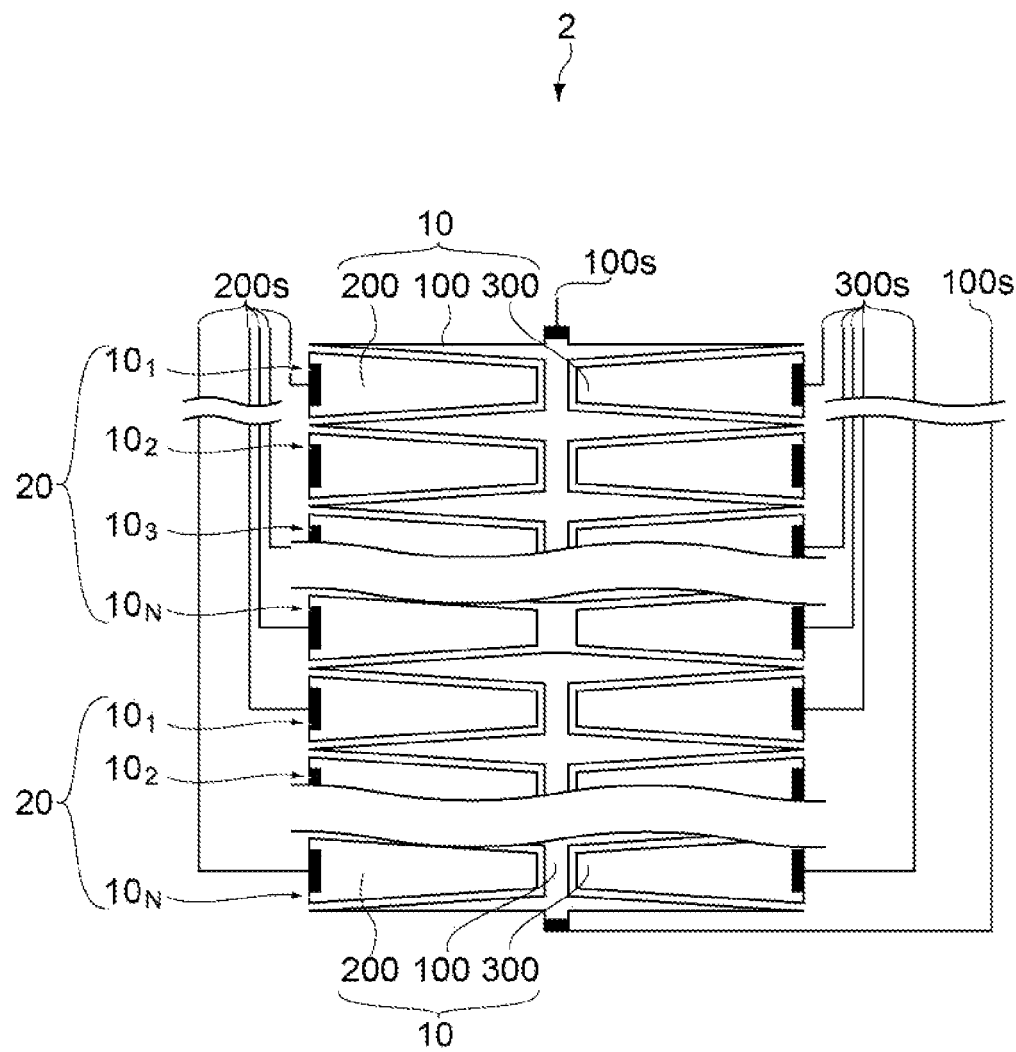
FIG. 5 is a schematic plane view of a capacitance sensor according to a second embodiment.

FIG. 5 is a schematic plane view of a capacitance sensor according to a second embodiment.

The support body 14 of the capacitance sensor 2 supports the plurality of electrode groups 10 of the first embodiment as electrode group units 20 in such a state that the plurality of electrode groups 10 are connected to each other via the third regions 110, a plurality of (for example, two) electrode group units 20 are arranged along the Y axis direction. The plurality of electrode group units 20 are electrically insulated. To the first electrodes 100 of the plurality of electrode group units 20, the signal lines 100s are connected, respectively.

With this configuration, when count values of the first electrodes 100 of the plurality of (for example, two) electrode group units 20 are detected, it is possible to determine which of an upper half region and a lower half region of the detection area SA the detection target is in proximity to or in contact with.

Third Embodiment

Figure 6:
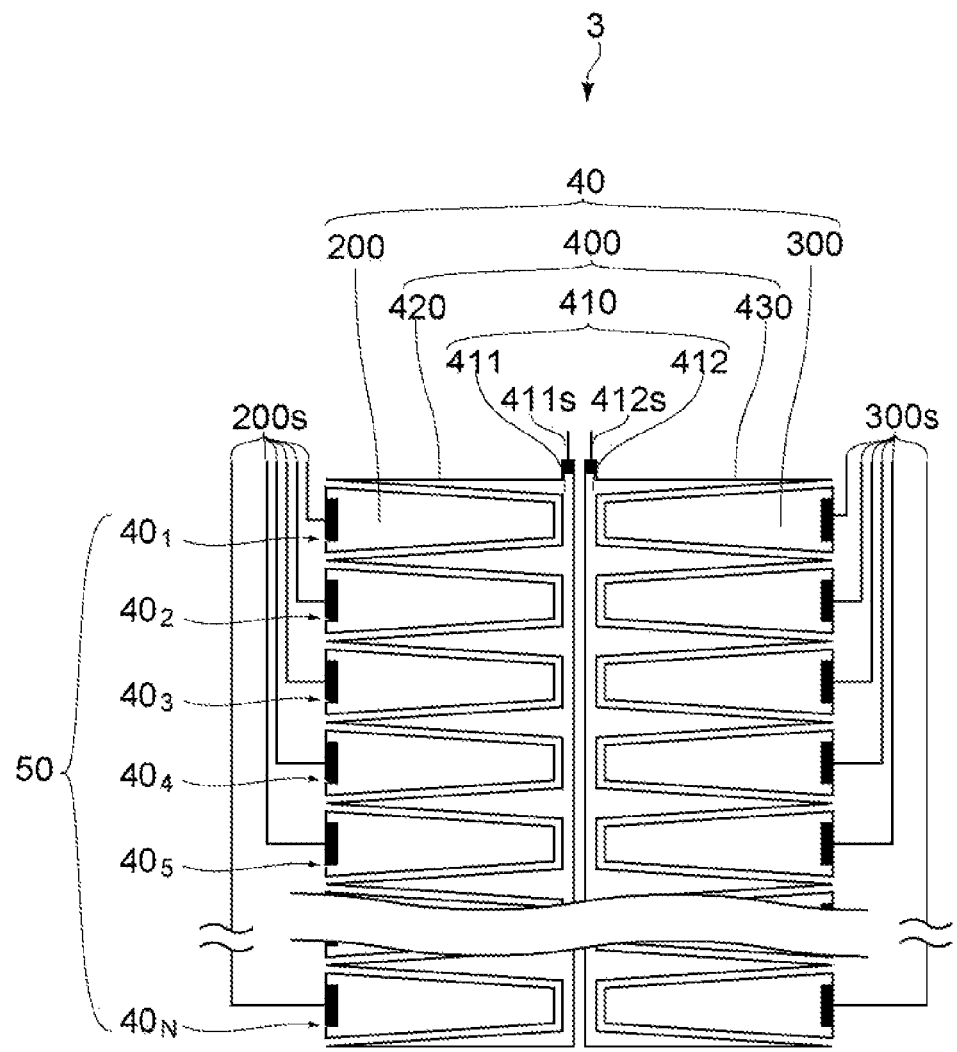
FIG. 6 is a schematic plane view of a capacitance sensor according to a third embodiment.

FIG. 6 is a schematic plane view of a capacitance sensor according to a third embodiment.

Each of electrode groups 40 of the capacitance sensor 3 includes a first electrode 400, and a second electrode 200 and a third electrode 300 that are the same as those of the first embodiment. A third region 410 of the first electrode 400 is a region that causes a first region 420 and a second region 430 to be opposed to each other in such a state that the first region 420 and the second region 430 are away from each other, and includes a first connection part 411 and a second connection part 412 away from each other. The first connection part 411 and the second connection part 412 of the third region 410 have such a shape that the third region 110 of the first electrode 100 of the first embodiment is separated in the X axis direction with respect to the central part in the X axis direction. The first connection part 411 connects the first regions 420 of the plurality of electrode groups 40 to each other in the Y axis direction. The second connection part 412 connects the second regions 430 of the plurality of electrode groups 40 to each other in the Y axis direction. To one end in the Y axis direction of the first connection part 411 and the second connection part 412 of the first electrode 400, signal lines 411s and 412s are connected.

With this configuration, when a count value of a portion, to which the first regions 420 of the plurality of electrode groups 40 are connected by the first connection parts 411, and a count value of a portion, to which the second regions 430 of the plurality of electrode groups 40 are connected by the second connection parts 412 are detected, it is possible to determine which of a right half region and a left half region of the detection area SA the detection target is in proximity to or in contact with.

Fourth Embodiment

Figure 7:
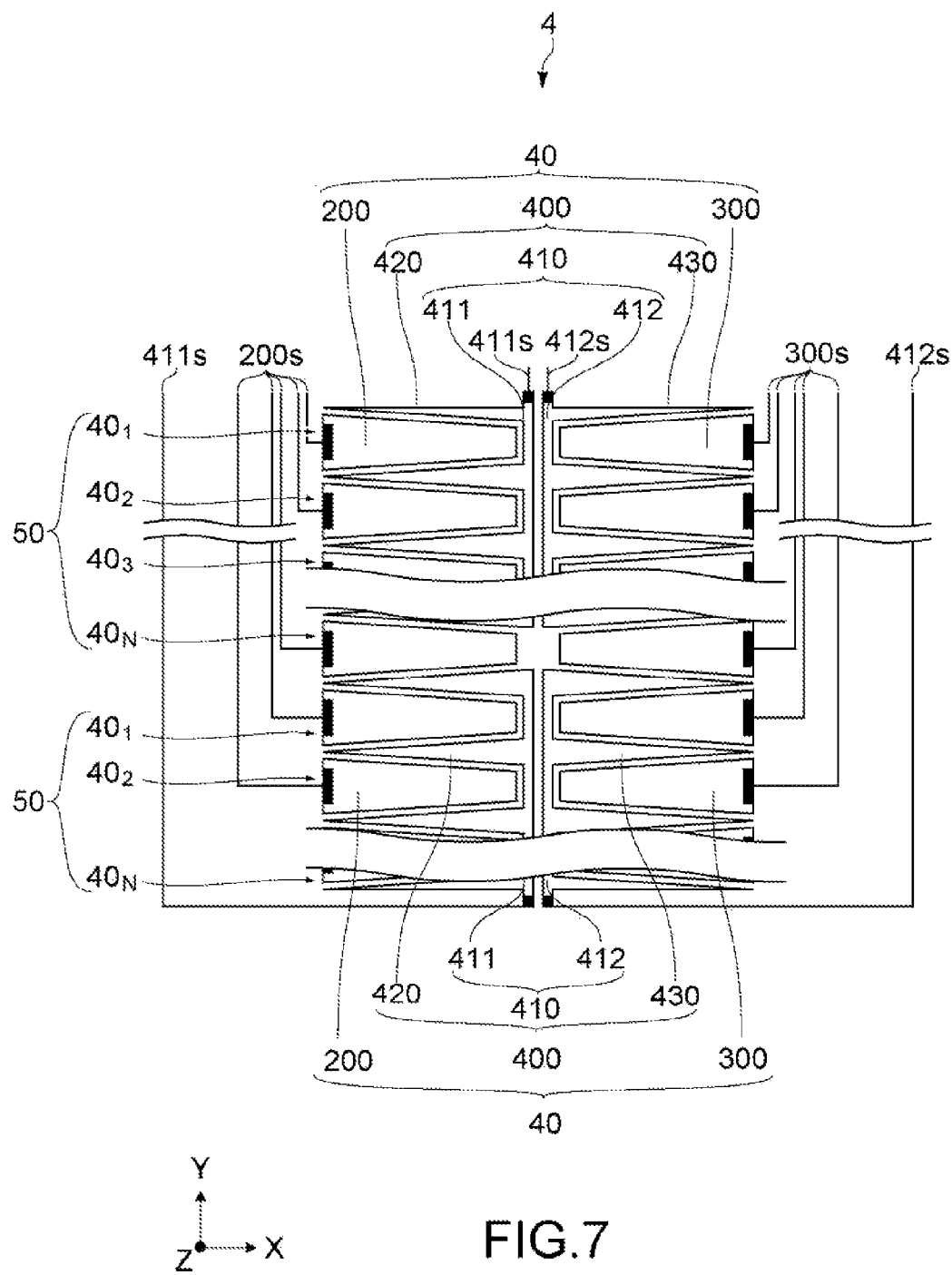
FIG. 7 is a schematic plane view of a fourth sensor according to a fourth embodiment.

FIG. 7 is a schematic plane view of a capacitance sensor according to a fourth embodiment.

The support body 14 of the capacitance sensor 4 supports a plurality of electrode groups 40 of the third embodiment as electrode group units 50 in such a state that the plurality of electrode groups 40 are connected to each other via the first connection parts 411 and the second connection parts 412 of the third regions 410, and arranges the plurality of (for example, two) electrode group units 50 along the Y axis direction. The plurality of electrode group units 50 are electrically insulated. To one end in the Y axis direction of the first connection part 411 and the second connection part 412 of the first electrode 400 of each of the plurality of electrode group units 50, signal lines 411s or 412s is connected.

With this configuration, when count values of portions, to which the first regions 420 of the plurality of electrode groups 40 of the plurality of (for example, two) electrode group units 50 are connected by the first connection parts 411, and count values of portions, to which the second regions 430 of the plurality of electrode groups 40 are connected by the second connection parts 412 are detected, it is possible to determine which of an upper right half region, an upper left half region, a lower right half region, and a lower left half region of the detection area SA the detection target is in proximity to or in contact with.

Although the foregoing is a description of the embodiments, the present application is not limited to these embodiments. The embodiments can be modified in various manners on the basis of the technical idea of the present application.

For example, in each of the above-mentioned embodiments, the capacitance sensor is disposed on the operation screen. Alternatively, the capacitance sensor may be solely installed within the case of the electronic apparatus, as with a touch pad or the like. In this case, the capacitance sensor does not necessarily need to be translucent, and therefore the electrodes of the sensor may be formed of a non-translucent material such as metal.

In the above-mentioned embodiment, the boundary parts between the electrodes constituting the electrode group are formed of straight oblique sides. Besides, the boundary parts may be configured in a zigzag form by which the height of the electrodes varies on a step-by-step basis. Alternatively, the boundary parts may be made inclined in a curved form. In this case, the sensor can be higher in detection resolution at the central part thereof than at the side parts thereof in the width direction.

In addition, in each of the above-mentioned embodiments, the first electrode is configured to have a maximum height at the central part thereof in the width direction or at the both ends thereof in the width direction. Alternatively, the maximum height can be changed as appropriate depending on demanded detection resolution in accordance with the specification of the apparatus.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A capacitance sensor, comprising:
   a first electrode including
      a first region that is gradually larger in height, with respect to a width direction parallel to a first direction, in parallel with a second direction orthogonal to the first direction,
      a second region that is gradually smaller in height with respect to the width direction, and
      a third region that causes the first region and the second region to be opposed to each other;
   a second electrode that is opposed to the first region in the second direction, and gradually smaller in height with respect to the first direction, in parallel with the second direction;
   a third electrode that is opposed to the second region in the second direction, and gradually larger in height with respect to the first direction, in parallel with the second direction; and
   a support body configured to support a plurality of electrode groups each including the first, second, and third electrodes in such a state that the plurality of electrode groups are connected to each other via the third region, and to arrange the plurality of electrode groups along the second direction.

2. The capacitance sensor according to claim 1, wherein
the first region has a first oblique side opposed to the second electrode, and
the second region has a second oblique side opposed to the third electrode.

3. The capacitance sensor according to claim 2, wherein
each of the first region and the second region has a maximum value of the height at a connection part with the third region.

4. The capacitance sensor according to claim 3, wherein
the first electrode is made wide to cover a detection area of a detection target along the first direction, and
each of the second and third electrodes has a first end opposed to the third region and a second end directed toward an outside of the detection area with respect to the first direction.

5. The capacitance sensor according to claim 4, wherein
the third region causes the first region and the second region to be opposed to each other in such a state that the first region and the second region are connected to each other.

6. The capacitance sensor according to claim 5, wherein
the support body supports the plurality of electrode groups in such a state that the plurality of electrode groups are connected to each other via the third region as a plurality of electrode group units, and arranges the plurality of electrode group units along the second direction.

7. The capacitance sensor according to claim 4, wherein
the third region includes;
    a first connection part that connects one first region to another first region of the plurality of electrode groups; and
    a second connection part that is opposed to the first connection part
in such a state that the second connection part is away from the first connection part, and that connects one second region to another second region of the plurality of electrode groups.

8. The capacitance sensor according to claim 7, wherein
the support body supports the plurality of electrode groups in such a state that the plurality of electrode groups are connected to each other via the third region as a plurality of electrode group units, and arranges the plurality of electrode group units along the second direction.

9. An information input apparatus, comprising:
a first electrode including:
    a first region that is gradually larger in height, with respect to a width direction parallel to a first direction, in parallel with a second direction orthogonal to the first direction;
    a second region that is gradually smaller in height with respect to the width direction; and
    a third region that connects the first region with the second region;
a second electrode that is opposed to the first region in the second direction, and gradually smaller in height with respect to the first direction, in parallel with the second direction;
a third electrode that is opposed to the second region in the second direction, and gradually larger in height with respect to the first direction, in parallel with the second direction;
a support body configured to support a plurality of electrode groups each including the first, second, and third electrodes in such a state that the plurality of electrode groups are connected to each other via the third region, and to arrange the plurality of electrode groups along the second direction;
a signal generation section configured to generate signal voltages to oscillate the first to third electrodes; and
a control section configured to generate a control signal containing information about position of a detection target with respect to the first and second directions, on a basis of a change in capacitance of the plurality of electrode groups.

10. The information input apparatus according to claim 9, further comprising:
a display element that is opposed to the support body and has a display surface for an image, wherein
the control signal includes a signal for controlling an image to be displayed on the display surface.

11. The information input apparatus according to claim 10, wherein
the plurality of electrode groups and the support body are each formed of a translucent material.

* * * * *